Dec. 6, 1927. 1,651,779

L. ROUANET

DEVICE FOR ASSEMBLING TWO-PIECE BALL BEARING CAGES BY SPOT WELDING

Filed Dec. 24, 1926

L. Rouanet
INVENTOR

By Marks & Clark
H. Hys

Patented Dec. 6, 1927.

1,651,779

UNITED STATES PATENT OFFICE.

LOUIS ROUANET, OF IVRY-PORT, FRANCE, ASSIGNOR TO COMPAGNIE D'APPLICATIONS MECANIQUES, OF IVRY-PORT, FRANCE, A FRENCH COMPANY.

DEVICE FOR ASSEMBLING TWO-PIECE BALL-BEARING CAGES BY SPOT WELDING.

Application filed December 24, 1926, Serial No. 156,911, and in France January 15, 1926.

The present invention has for object a device or apparatus enabling the application of spot welding to the assembly of two-piece sheet metal cages for ball bearings, in which the two parts of the cages are located respectively on each side of the balls suitably spaced between the inner and outer races of a ball bearing, in such a manner that the spot welds can be made by means of a suitable tool.

The said device is characterized in that, it comprises a base and a cap that can be clamped together, each having a central boss extending into the bore of the inner race, of the bearing, the base being further provided with bearing members circularly arranged around the central boss to form seats for the flat parts of the cage located between two consecutive balls, while opposite the seats openings are provided in the cap enabling the passage of the welding tool.

This device enables the ball bearing to be securely held in the correct position during the welding operation, and also permits the welder to give his entire attention to the welding tool without having to take care to hold the parts to be welded stationary.

In addition, the device permits considerable reduction of the clear space which is to be left between the ball receiving pockets of the cage when the assembly is effected by means of rivets. This reduction in the space between the pockets enable a larger number of balls to be inserted between the two races.

The invention will however be more clearly understood with reference to the accompanying drawing, showing by way of example one embodiment of the device.

Figure 1:
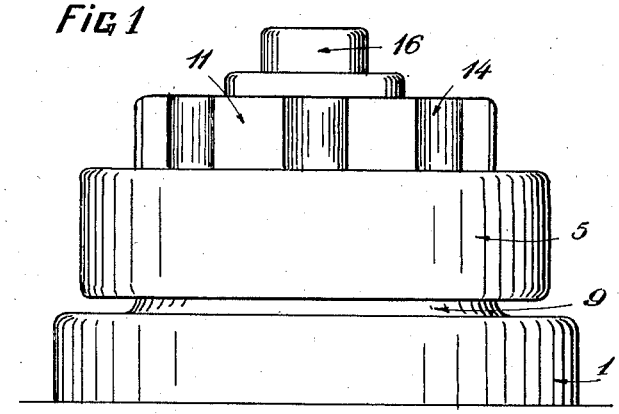
Fig. 1 is a side elevation.
Figure 2:
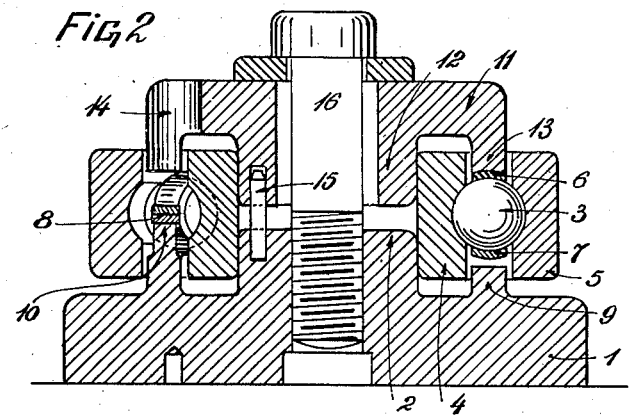
Fig. 2 is a section taken on the broken line A—A of Fig. 3.
Figure 3:
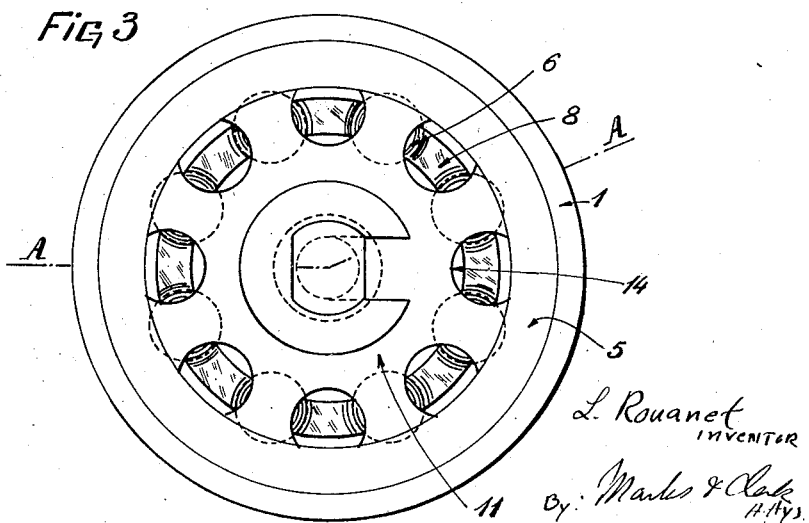
Fig. 3 is a plan view.

The device includes a base 1 having a central boss 2 enabling the ball bearing 3 to be centered on the said base, the inner race 4 of the bearing fitting exactly onto the boss 2. Between the inner race 4 and the outer race 5 of the ball bearing is located the retaining cage.

The said cage is formed of two parts 6 and 7, the part 6 surrounding the upper part of the balls and the part 7 surrounding the lower part of the balls. Between any two adjacent balls the two parts 6 and 7 of the cage approach and touch each other, forming a small flat region 8. It is at this flat region 8 that the two parts 6 and 7 of the cage are to be assembled together by means of a spot weld. The base 1 is provided with a rim 9 concentric with the boss 2 and arranged to enter the space between the inner race 4 and the outer race 5 of the bearing, the upper edge of the said rim being shaped so as to provide bearing members or seats 10, on which the flat regions 8 of the cage 6—7 rest. The ball bearing 3—4—5 can therefore be placed exactly and firmly in position on the base 1, the inner race being centered on the boss 2 and the cage 6—7 being supported by the seats 10. It is not necessary that the rim 9 come into contact with the curved parts on the lower part 7 of the cage, which form the pockets for the balls 3.

In order to hold the bearing in this stable position on the base 1, and also in order to enable the two parts 6 and 7 of the cage to be welded together at the flat regions 8, a cap 11 also having a central boss 12 is so arranged above the ball bearing that the boss 12 exactly enters the bore of the inner race 4.

The cap 11 can also be provided with a rim 13 extending into the space between the inner race 4 and the outer race 5, of the ball bearing so as to form a guide between the said races. Openings 14, located opposite the seats 10 on the base 1, are provided in the cap 11. Since the flat regions 8 of the cage rest on the said seats 10, the openings 14 enable the welding tool to be introduced and to reach the said flat regions 8.

In order to prevent rotative movement of the cover 11 relative to the base 1, a pin 15 engages simultaneously in a housing formed in the base and in a housing formed in the cap; the openings 14 are thus kept exactly over the seats 10.

To provide for the rigid assembly of the device the cap and the base are clamped together, for example by means of a central bolt 16 freely extending through the cap and screwed into the base 1.

If desired the edge of the rim 13 can be shaped so as to accommodate the pockets in the cage to insure the cage itself to be centered.

The device enables the bearing to be securely held in the correct position during the welding operation; it enables the welder to devote his entire attention to the welding tool without having to take care to hold the parts to be welded stationary. In addition, the device enables considerable reduction of the clear space which is to be left between the ball receiving pockets of the cage when the assembly was effected by means of rivets. This reduction in the space between the pockets thus enables a larger number of balls to be inserted between the two races.

The invention is not limited to the above described example of construction, since all modifications based on the same principles fall within the scope of the invention. Thus, the arrangement could be reversed, the holes 14 being provided in the base and the seats 10 on the cap, so as to enable the device supporting the ball bearing to be placed on a set of stationary welding tools.

Claims:

1. A device enabling two-piece cages for ball bearings to be assembled by spot welding, characterized by the fact that it comprises a base and a cap that can be clamped together and each of which has a central boss entering the bore of the inner race of the ball bearing, the base being further provided with bearing members or seats circularly arranged around the central boss, in order to serve as seats for the flat regions or parts of the cage included between two consecutive balls, while openings enabling the welding tool to be introduced are provided in the cap opposite the said seats.

2. A device according to claim 1, characterized by the fact that the base and the cap are provided with retaining members, such as a pin engaging both the base and the cap, to prevent rotation of the cap relative to the base.

3. A device according to claim 1, characterized by the fact that both the base and the cap are provided with a rim or the like entering the space between the inner race and the outer race of the bearing, serving as a guide between the said races.

4. A device according to claim 1, characterized by the fact that both the base and the cap are provided with a rim or the like entering the space between the inner race and the outer race of the bearing, the edge of one of said rims being shaped so as to accommodate the shape of the pockets in the cage, in order to insure the centering of the latter.

In testimony whereof I affix my signature.

LOUIS ROUANET.